United States Patent
Okamoto et al.

(10) Patent No.: US 8,747,094 B2
(45) Date of Patent: Jun. 10, 2014

(54) MULTILAYER MOLDING APPARATUS AND INJECTION MOLDING METHOD

(75) Inventors: Akio Okamoto, Yamaguchi (JP);
Kazuaki Miyamoto, Yamaguchi (JP);
Toshikazu Iwamoto, Yamaguchi (JP);
Atsushi Shinada, Yamaguchi (JP);
Etsuji Ota, Yamaguchi (JP)

(73) Assignee: UBE Machinery Corporation, Ltd. (JP)

( * ) Notice: Subject to any disclaimer, the term of this patent is extended or adjusted under 35 U.S.C. 154(b) by 279 days.

(21) Appl. No.: 13/398,407

(22) Filed: Feb. 16, 2012

(65) Prior Publication Data
US 2012/0219655 A1    Aug. 30, 2012

(30) Foreign Application Priority Data
Feb. 28, 2011   (JP) .................. 2011-041072

(51) Int. Cl.
*B29C 45/04* (2006.01)
(52) U.S. Cl.
USPC .................. 425/190; 425/577; 264/328.7
(58) Field of Classification Search
USPC ................... 425/190, 577; 264/328.7
See application file for complete search history.

(56) References Cited

U.S. PATENT DOCUMENTS

| | | | | |
|---|---|---|---|---|
| 3,609,803 A | * | 10/1971 | Fattori | 425/526 |
| 4,744,741 A | | 5/1988 | Glover et al. | |
| 6,139,305 A | * | 10/2000 | Nesch | 425/130 |
| 6,558,149 B1 | * | 5/2003 | Bodmer et al. | 425/192 R |
| 7,455,516 B2 | * | 11/2008 | Glashagen et al. | 425/572 |
| 7,484,948 B2 | * | 2/2009 | Wimberger | 425/112 |
| 7,488,167 B2 | | 2/2009 | Wimberger | |
| 7,670,125 B2 | * | 3/2010 | Armbruster | 425/123 |
| 2008/0193586 A1 | * | 8/2008 | Araujo | 425/576 |
| 2008/0317893 A1 | * | 12/2008 | Gruber | 425/149 |
| 2009/0252826 A1 | * | 10/2009 | Choi et al. | 425/547 |

FOREIGN PATENT DOCUMENTS

| | | |
|---|---|---|
| CN | 101119837 A | 2/2008 |
| JP | 2006-168223 A | 6/2006 |
| JP | 2010-149450 | 7/2010 |

OTHER PUBLICATIONS

Search report which issued in connection with a corresponding Chinese Application on Dec. 18, 2013.

* cited by examiner

*Primary Examiner* — James Sanders
(74) *Attorney, Agent, or Firm* — Clark Hill PLC (57) ABSTRACT

A multilayer molding apparatus, comprising: a fixed platen; a movable platen; an intermediate platen positioned between the fixed platen and the movable platen to be movable in the direction to come close or be opened, and having a surface facing the fixed platen, a surface facing the movable platen, and a housing space that goes therethrough from the surface facing the fixed platen to the surface facing the movable platen; and a rotary platen rotatably supported by the intermediate platen inside the housing space of the intermediate platen, and having at least one pair of parallel surfaces facing the fixed platen and the movable platen, wherein at least one of the surfaces of the intermediate platen facing the fixed platen and the movable platen is a mold mounting surface on which a mold can be mounted directly or indirectly.

12 Claims, 6 Drawing Sheets

MULTILAYER MOLDING APPARATUS AND INJECTION MOLDING METHOD

CROSS-REFERENCE TO RELATED APPLICATIONS

This application is based upon and claims the benefit of priority from the prior Japanese Patent Application No. 2011-41072, filed on Feb. 28, 2011, the entire contents of which are incorporated herein by reference.

BACKGROUND OF THE INVENTION

1. Field of the Invention

The present invention relates to an injection molding apparatus including a fixed platen, a movable platen, and an intermediate platen (rotary platen) positioned between the fixed platen and the movable platen, and an injection molding method.

2. Description of the Related Art

There have conventionally been known multilayer molded products composed of various combinations of resin molded components, such as a multilayer molded product in which a plurality of resin molded components made of different materials are combined, a multilayer molded product in which a plurality of resin molded components made of the same material are combined, a multilayer molded product in which a plurality of resin molded components made of materials of different colors are combined, a multilayer molded product in which a plurality of resin molded components made of materials of the same color are combined, etc. Also, various molding methods are known as methods for forming such a multilayer molded product, such as a method using a characteristic molding apparatus, a method using a characteristic mold, etc. Among such molding methods is a method of forming a multilayer molded product by mounting a fixed mold, a movable mold, and a rotary mold on a multilayer molding apparatus including a fixed platen, a movable platen, and an intermediate plate (rotary platen) positioned between the fixed platen and the movable platen.

Patent Document 1 (Unexamined Japanese Patent Application Publication No. 2006-168223) discloses a multi-material injection molding apparatus (multilayer molding apparatus) for forming a multi-material molded product (multilayer molded product) by using a molding unit comprising a fixed mold (fixed mold), a movable mold (movable mold), and a rotary mold (rotary mold) which rotates between the fixed mold and the movable mold. The multi-material injection molding apparatus includes: a first injection device (first injection unit) which connects with the fixed mold for injecting a melt material; a second injection device which connects with the movable mold for injecting a melt material; a rotary mold support unit which supports the rotary mold from the part of the fixed mold such that the rotary mold can freely rotate and freely move in the moving direction of the movable mold; and a compressing means (mold clamping unit) which compresses the fixed mold and the movable mold through the rotary mold.

Patent Document 2 (U.S. Pat. No. 7,488,167) discloses a closing unit (mold clamping unit) which includes: first and second platens (a fixed platen and a movable platen which of which may be whichever of the first and second platens) of which at least one is movable to the other; an intermediate plate (rotary platen) disposed between the first and second platens; a molding tool disposed between one of the first and second platens and the intermediate plate; a means which limits the move of a mold between the other of the first and second platens and the intermediate plate, and includes a dummy mold which is disposed between the other of the first and second platens and the intermediate plate and not used for forming a molded product; and at least one ejector (product push-out means) arranged in or on the intermediate plate.

Note that the parentheses in the above descriptions relating to Patent Document 1 and Patent Document 2 are given for mentioning the components, etc. of the present invention that are considered to be equivalent or similar to the components immediately before the parentheses for better understanding of the present invention, and are not meant to suggest that the components, etc. immediately before the parentheses are identical with the parenthesized components.

[Patent Document 1] Unexamined Japanese Patent Application Publication No. 2006-168223

[Patent Document 2] U.S. Pat. No. 7,488,167

SUMMARY OF THE INVENTION

However, the multi-material injection molding apparatus of Patent Document 1 and the mold clamping device of Patent Document 2 have a problem that the size of the molds that can be used in them is limited.

That is, in the multi-material injection molding apparatus of Patent Document 1, the rotary mold has parallel parting lines on both of which mold cavities are to be formed, and hence the length of the rotary mold in its thickness direction (hereinafter referred to as "mold height") is long, and an upper platen (=the component denoted by a numeral 18 in FIG. 1 of Patent Document 1) and a lower platen (=the component denoted by a numeral 19 in FIG. 1 of Patent Document 1) that hold the rotary mold need to be longer in the mold opening/closing direction than the mold height of the rotary mold. Furthermore, the multi-material injection molding apparatus of Patent Document 1 requires that the total mold height of all of the molds to be used be longer than the length of the upper platen and lower platen in their opening/closing direction and that the vertical direction length ("vertical dimension") of the molds to be used be shorter than the vertical distance between the upper platen and lower platen. Otherwise, the multi-material injection molding apparatus of Patent Document 1 cannot clamp the molds as hampered by the upper platen and lower platen. Hence, the multi-material injection molding apparatus of Patent Document 1 is problematic in that a mold with a small mold height or a mold with a vertical dimension that is larger than the vertical distance between the upper platen and lower platen cannot be used.

In the closing unit of Patent Document 2, the intermediate plate is swivelled by at least 180 degrees while two mold mounting surfaces of the intermediate plate are mounted with molds (rotary molds) respectively. Therefore, the closing unit of Patent Document 2 requires that the area of the mold mounting surfaces of the intermediate plate be smaller than the area of the mold mounting surfaces of the first and second platens. Hence, the closing unit of Patent Document 1 can only use a mold with a size that is adapted to the area of the mold mounting surfaces of the intermediate plate, and is problematic in that even if the first and second platens are mountable with a large mold, such a large mold cannot be used.

Besides, the closing unit of Patent Document 2 is for use in a multilayer molding machine for forming a first molded component by the mold between the one of the first and second platens and the intermediate plate, swivelling the intermediate plate with the first molded component held in the mold half on the part of the intermediate plate, and then forming a second molded component by a mold between the other of the first and second platens and the intermediate plate such that the second molded component is molded on the first molded component. Such a closing unit of Patent Document 2 includes at least one ejector in or on the intermediate plate, because a no-design surface of the first molded component held in the mold half on the part of the intermediate plate has to be pushed in order for the product to be ejected. Furthermore, such a closing unit of Patent Document 2 requires, in order to form multilayer molded products continuously, that the two mold mounting surfaces of the intermediate plate facing the first and second platens respectively be provided, with ejectors respectively for ejecting a resin molded product, and that ejector pins of all of the ejectors have the same configuration. Moreover, in the closing unit of Patent Document 2, the thickness of the intermediate plate in the mold opening/closing direction is large as shown in FIG. 3 and FIG. 4 of Patent Document 2, in order for an ejection stroke to be secured for the respective ejectors. Hence, the closing unit of Patent Document 2 can secure only a small day light between the one of the first and second platens and the intermediate plate, and is problematic in that the largest mold height that can be used is limited. Here, the day light is the distance between the facing mold mounting surfaces when the mold halves are opened to the largest degree. In the closing unit of Patent Document 2, the day light refers to the distance between the mold mounting surface of the one of the first and second platens and the mold mounting surface of the intermediate plate when the mold halves are opened to the largest degree.

An object of the present invention is to provide a multilayer molding apparatus and an injection molding method which can reduce the limitations on the size of the mold that can be used.

To achieve the above object, one multilayer molding apparatus according to the present invention includes: a fixed platen; a movable platen positioned so as to face the fixed platen and to be movable in a direction to come close to or be opened from the fixed platen; an intermediate platen positioned between the fixed platen and the movable platen to be movable in the direction to come close or be opened, and having a surface facing the fixed platen, a surface facing the movable platen, and a housing space that goes therethrough from the surface facing the fixed platen to the surface facing the movable platen; and a rotary platen rotatably supported by the intermediate platen inside the housing space of the intermediate platen, and having at least one pair of parallel surfaces facing the fixed platen and the movable platen, wherein at least one of the surfaces of the intermediate platen facing the fixed platen and the movable platen is a mold mounting surface on which a mold can be mounted directly or indirectly.

In one multilayer molding apparatus according to the present invention, the intermediate platen and the rotary platen may have substantially the same thickness in the direction to come close and be opened, and the multilayer molding apparatus may be capable of having the mold mounted on the mold mounting surface of the intermediate platen directly.

In one multilayer molding apparatus according to the present invention, the intermediate platen and the rotary platen may have different thicknesses in the direction to come close and be opened, the multilayer molding apparatus may further include a mold mounting plate for filling a thickness gap in the direction to come close and be opened between the intermediate platen and the rotary platen, the mold mounting plate may include a portion located between the rotary platen and the mold and a portion located between the intermediate platen and the mold, and the multilayer molding apparatus may be capable of having the mold mounted on the mold mounting surface of the intermediate platen indirectly through the mold mounting plate.

In one multilayer molding apparatus according to the present invention, the multilayer molding apparatus may further include mold mounting means which mounts the mold on the mold mounting surface of the intermediate platen, and the mold mounting means may be provided to the mold mounting surface of the intermediate platen.

In one multilayer molding apparatus according to the present invention, the multilayer molding apparatus may further include product push-out means provided on the part of at least one of the fixed platen and the movable platen, the product push-out means may include a push-out pin for pushing out a molded product formed between the fixed platen and the intermediate platen or a molded product formed between the movable platen and the intermediate platen, and the rotary platen may have a push-out pin through-hole at a position coinciding with the push-out pin, for letting the push-out pin go through.

In one multilayer molding apparatus according to the present invention, the multilayer molding apparatus may further include product push-out means provided on the part of at least one of the fixed platen and the movable platen, the product push-out means may include a push-out pin for pushing out a molded product formed between the fixed platen and the intermediate platen or a molded product formed between the movable platen and the intermediate platen, and the mold mounting plate may have a push-out pin through-hole at a position coinciding with the push-out pin, for letting the push-out pin go through. In this case, the rotary platen may have a push-out pin through-hole at a position coinciding with the push-out pin, for letting the push-out pin go through.

In one multilayer molding apparatus according to the present invention, the rotary platen may have a hot runner between one and the other of the at least one pair of parallel surfaces.

In one multilayer molding apparatus according to the present invention, the mold mounting plate may have in the portion located between the rotary platen and the mold, an injection unit insertion through-hole into which an injection unit can be inserted or a hot runner through which a melt resin injected from the injection unit flows.

One injection molding method according to the present invention is an injection molding method using the multilayer molding apparatus described above, and includes fixing at least one of the intermediate platen and the rotary platen on one of the fixed platen and the movable platen and clamping a mold mounted between the other of the fixed platen and the movable platen and the intermediate platen.

One injection molding method according to the present invention may be an injection molding method using the multilayer molding apparatus described above and further including product push-out means provided on the part of least one of the fixed platen and the movable platen, wherein the product push-out means includes a push-out pin for pushing out a molded product formed between the fixed platen and the intermediate platen or a molded product formed between the movable platen and the intermediate platen, and the rotary platen has a push-out pin through-hole at a position coinciding with the push-out pin for letting the push-out pin go through, the method including pushing out a molded product formed between the fixed platen and the intermediate platen or a molded product formed between the movable platen and the intermediate platen by letting the push-out pin of the product push-out means go through the push-out pin through-hole formed in the rotary platen.

Another injection molding method according to the present invention is an injection molding method using the multilayer molding apparatus described above, and includes fixing at least one of the intermediate platen and the rotary platen on one of the fixed platen and the movable platen directly or indirectly through the mold mounting plate, and clamping a mold mounted between the other of the fixed platen and the movable platen and the intermediate platen.

Another injection molding method according to the present invention is an injection molding method using the multilayer molding apparatus described above and further including product push-out means provided on the part of at least one of the fixed platen and the movable platen, wherein the product push-out means includes a push-out pin for pushing out a molded product formed between the fixed platen and the intermediate platen or a molded product formed between the movable platen and the intermediate platen, and at least one of the mold mounting plate and the rotary platen have/has a push-out pin through-hole at a position coinciding with the push-out pin for letting the push-out pin go through, the method including pushing out a molded product formed between the fixed platen and the intermediate platen or a molded product formed between the movable platen and the intermediate platen by letting the push-out pin of the product push-out means go through the push-out pin through-hole formed in at least one of the mold mounting plate and the rotary platen.

According to the present invention, it is possible to provide a multilayer molding apparatus and an injection molding method which can reduce the limitations on the size of the mold that can be used.

DETAILED DESCRIPTION OF THE EMBODIMENTS

Embodiments for implementing the present invention will now be explained in detail with reference to the attached drawings.

Figure 1:
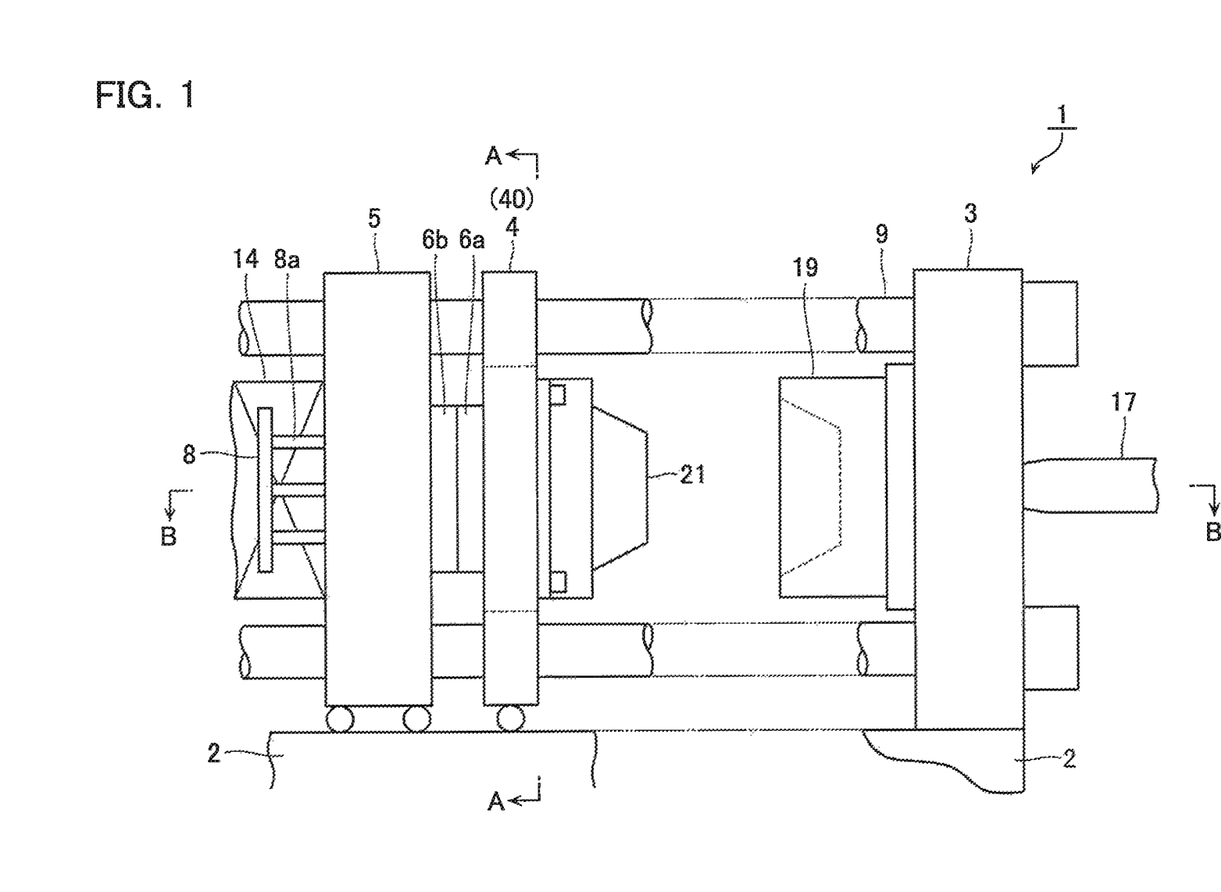
FIG. 1 is a schematic side elevation of a multilayer molding apparatus according to Embodiment 1 of the present invention.
Figure 2:
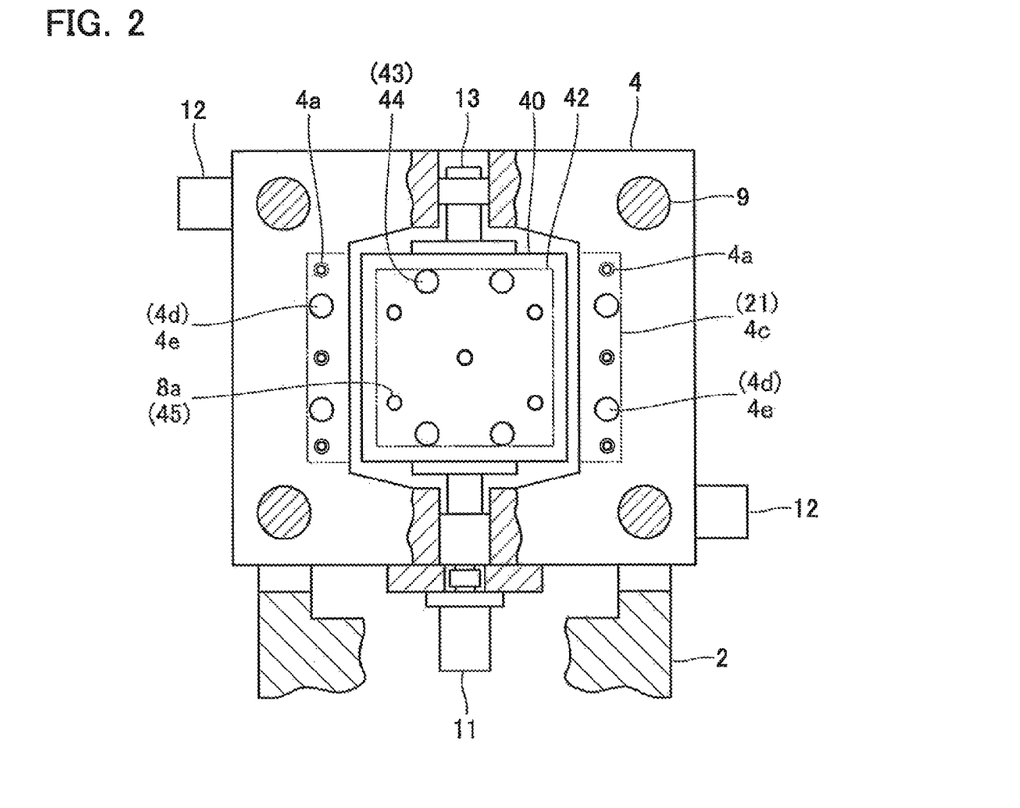
FIG. 2 is a schematic front elevation taken along a line A-A of FIG. 1 and seen in the direction of arrows.
Figure 3:
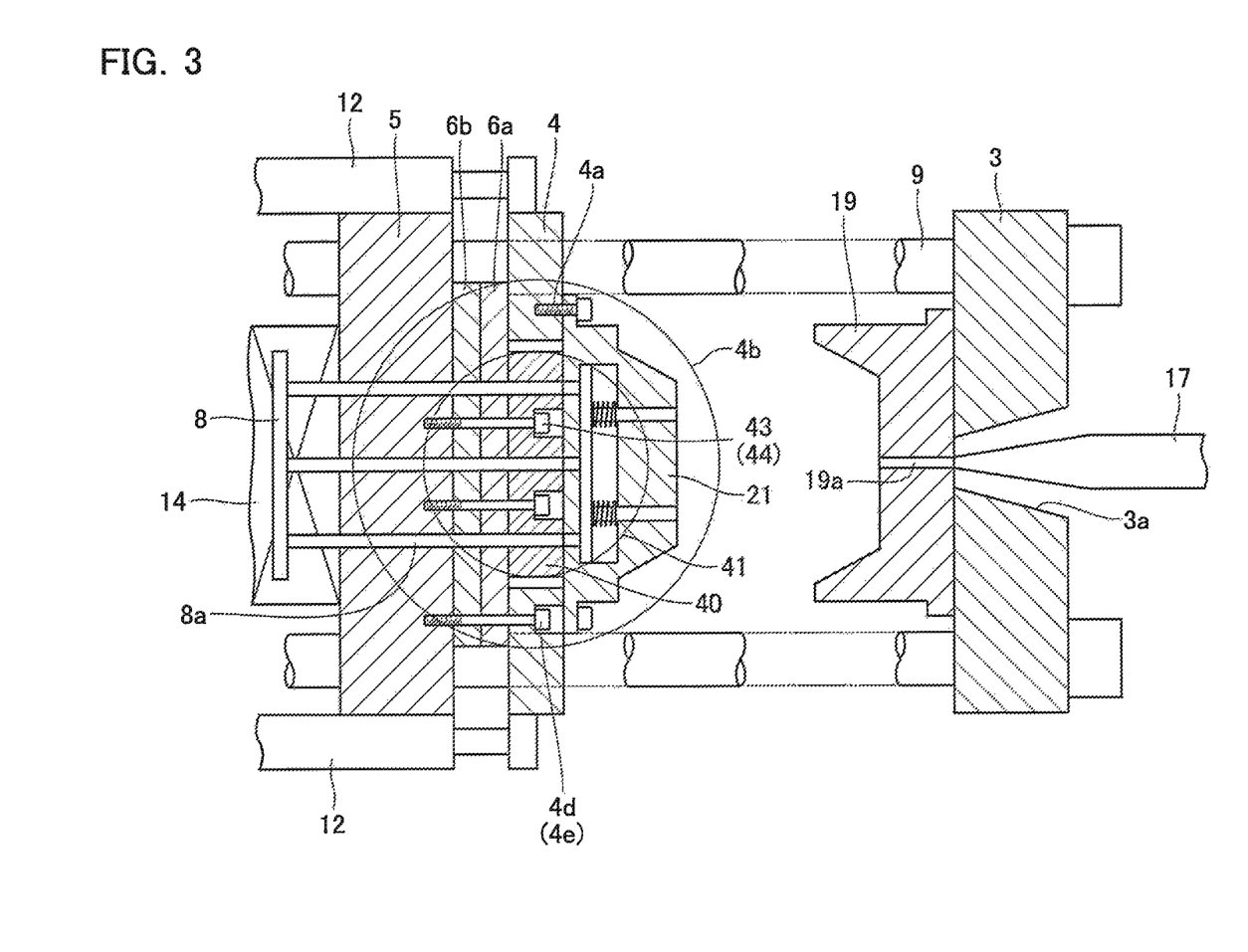
FIG. 3 is schematic cross-sectional, plan view taken along a line B-B of FIG. 1 and seen in the direction of arrows.

Embodiment 1 of the present invention will now be explained with reference to FIG. 1 to FIG. 3. FIG. 1 is a schematic side elevation of a multilayer molding apparatus according to Embodiment 1 of the present invention. FIG. 2 is a schematic front elevation taken along a line A-A of FIG. 2 and seen in the direction of arrows. FIG. 3 is a schematic cross-sectional plan view taken along a line B-B of FIG. 1 and seen in the direction of arrows.

First, the basic configuration of a multilayer molding apparatus 1 according to the present embodiment will be explained. As shown in FIG. 1, FIG. 2, and FIG. 3, the multilayer molding apparatus 1 includes: a fixed platen 3 fixed on a bed 2; a movable platen 5 positioned so as to face the fixed platen 3 and to be movable with respect to the fixed platen 3 in a mold opening/closing direction; an intermediate platen 4 provided between the fixed platen 3 and the movable platen 5 so as to be movable in the mold opening/closing direction, having a surface facing the fixed platen 3 and a surface facing the movable platen 5, and having a housing space which goes through the intermediate platen 4 from the surface facing the fixed platen 3 to the surface facing the movable platen 5; a rotary platen 40 rotatably supported by the intermediate platen 4 inside the housing space of the intermediate platen 4 and having at least one pair of parallel surfaces facing the fixed platen 3 and the movable platen 5; a first injection unit 17 provided on the part of the fixed platen 3; and a mold clamping unit 14 for moving the movable platen 5 with respect to the fixed platen 3 in the mold opening/closing direction. Here, the mold opening/closing direction is a direction in which the movable platen 5 comes close to or is opened from the fixed platen 3 (=the left-right direction in FIG. 1).

The fixed platen 3 is mounted with a mold on its front surface (=the surface facing the movable platen 5) and has a through-hole 3a formed therein from its rear surface its front surface for letting the first injection unit 17 move with respect to the mold. Tie bars 9 are provided to protrude from the four corners of the fixed platen 3 and to go through the intermediate platen 4 and the fixed platen 5.

The movable platen 5 has a mold mounting surface on its surface facing the fixed platen 3. The movable platen 5 is provided so as to be freely movable with respect to the fixed platen 3 by the mold clamping unit 14 as guided by the tie bars 9.

The intermediate platen 4 is positioned between the fixed platen 3 and the movable platen 5, and provided to be freely movable in the mold opening/closing direction by intermediate platen moving units 12 provided on the movable platen 5 as likewise guided by the tie bars 9 going therethrough at its four corners. The intermediate platen moving units 12 are configured by an actuator such as a hydraulic cylinder, etc., and two units are provided on approximately a diagonal line of the movable platen 5. The intermediate platen 4 has a housing ace which goes therethrough from its surface facing the fixed platen 3 to its surface facing the fixed platen 5. The intermediate platen 4 may have its load supported by the tie bars 9, but it is preferable that the intermediate platen 4 be configured to be supported on the bed 2 like the movable platen 5 through a structure such as a rotary roller, a linear motion guide, etc. that can reduce the sliding friction, to allow the tie bars 9 to function only as a guide in the mold opening/closing direction.

The rotary platen 40 has one pair of parallel mold mounting surfaces facing the fixed platen 3 and the movable platen 5. The rotary platen 40 is provided inside the housing space of the intermediate platen 4 so as to be rotatable through a rotary platen rotating unit 11 about a rotary shaft 13 extending in the vertical direction perpendicular to the mold opening/closing direction. The thickness of the rotary platen 40 in the mold opening/closing direction is substantially the same as the thickness of the intermediate platen 4 in the mold opening/closing direction. That is, the mold mounting surfaces of the rotary platen 40 are formed on the same planes as the surfaces of the intermediate platen 4 facing the fixed platen 3 and the movable platen 5 respectively, so as not to protrude ahead of the surfaces of the intermediate platen 4 facing the fixed platen 3 and the movable platen 5 at the positions facing the fixed platen 3 and the movable platen 5. The rotary platen rotating unit 11 is configured by: a rotary support member such as a thrust bearing, etc. that can support and rotate the loads of the rotary platen 40, a mold mounted on the rotary platen 40, etc.; and a driving means such as a servomotor, etc. A rotative force about a driving shaft of the driving means of the rotary platen rotating unit 11 may be transmitted to the rotary shaft 13 through a gear, a chain, a belt, etc., or directly through a coupling, etc. In any case, care should be taken so as to protect the driving shaft of the driving means of the rotary platen rotating unit 11 from being acted upon by any other thrust load in the axial direction or bending moment than a rotation moment.

When performing normal molding by using such multilayer molding apparatus 1, there is a problem that the size of the molds that can be used is limited, as described above. The configuration of the present embodiment for overcoming this problem will now be explained. Here, normal molding refers to injection molding performed without rotating the rotary platen 40, in which a mold mounted on the fixed platen 3 or on the movable platen 5 and a mold mounted on the rotary platen 40 are used.

The rotary platen 40 is rotated between the fixed platen 3 and the movable platen 5 and between the tie bars 9 by generally 180 degrees while being mounted with rotary molds on both of its two mold mounting surfaces facing the fixed platen 3 and the movable platen 5. Therefore, its mold mounting surfaces are necessarily smaller than the mold mounting surfaces of the fixed platen 3 and movable platen 5. Hence, when performing normal molding, the largest mounting dimension of the mold that can be used is limited by the size of a mold that can be mounted on the rotary platen 40, even if the fixed platen 3 and the movable platen 5 are mountable with larger molds. To avoid this, it is possible to upsize the rotary platen 40 to give the mold mounting surfaces thereof a similar area to the mold mounting surfaces of the fixed platen 3 and movable platen 5.

However, in this case, as shown in FIG. 3, largest rotation locus 4b of a rotary platen assumed to be mounted with a larger mold that is mountable on the fixed platen 3 and the movable platen 5 is extremely large as compared with a largest rotation locus 41 of the rotary platen 40. Hence, for performing multilayer molding, in order to secure this rotation space, it is necessary to provide a mold opening/closing stroke that is larger than provided in a general injection molding apparatus using molds having a similar size. Moreover, it is necessary to provide a larger support structure for the intermediate platen and rotary platen in order to support the larger rotary platen rotatably. As a result, the multilayer molding apparatus has to have a large total apparatus length and a large support structure for a large intermediate platen or rotary platen as compared with a general injection molding apparatus using molds that require similar mounting dimensions.

If, as in the multilayer molding apparatus according to the present embodiment, the mold mounting surfaces of the rotary platen 40 are formed on the same planes as the surfaces of the intermediate platen 4 facing the fixed platen 3 and the movable platen 5 at the positions facing the fixed platen 3 and the movable platen 5, and mold mounting means 4a formed of screw holes, T slots, or the like are provided in the surfaces of the intermediate platen 4 facing the fixed platen 3 and the movable platen 4, it is not necessary to use a multilayer molding apparatus described above having an up sized rotary platen but it is possible to mount, directly on the intermediate platen 5 easily, a mold indicated by a two-dot chain line 4c that is larger than a mold indicated by a two-dot chain line 42 mountable on the mold mounting surfaces of the rotary platen 40. If it is fixed on which surface of the intermediate platen 4 to mount a mold, the mold mounting means 4a need only to be provided on that surface.

Fixing bolt holes 4e to which fixing bolts 4d for fixing the intermediate platen 4 to the fixed platen 3 or to the movable platen 5 are attached are provided in the surfaces of the intermediate platen 4 facing the fixed platen 3 and the movable platen 5. For more secure fixing, it is preferable that fixing bolt holes 44 to which fixing bolts 43 for fixing the rotary platen 40 to the movable platen 5 are attached be also provided in the rotary platen 40. Spot faces are formed around the fixing bolt holes 4e and the fixing bolt holes 44 such that the heads of the bolts to be attached to them do not protrude upon the respective mold mounting surfaces. The intermediate platen 4 and the rotary platen 40 are fixed on the movable platen 5 through a dummy plate 6a for protecting their mold mounting surfaces and a dummy plate 6b for protecting the mold mounting surface of the movable platen 5.

Fixing bolt holes corresponding to the fixing bolts 4d and the fixing bolts 43 are provided in the respective dummy plates. Screw holes or the like corresponding to the fixing bolts 4d and the fixing bolts 43 are provided in the movable platen 5. These screw holes may be provided by inserting into T slots previously provided in the mold mounting surface of the movable platen 5 for mold mounting purposes, nuts or the like that can be inserted into the T slots. There may be provided only one dummy plate, as long as it is possible to protect the mold mounting surfaces of the intermediate platen 4, the rotary platen 40, and the movable platen 5.

According to a common multilayer molding method implemented by using a multilayer molding apparatus similar to the multilayer molding apparatus 1 according to the present embodiment, i.e., a multilayer molding apparatus including a fixed platen 3, a movable platen 5, and an intermediate platen 4 (rotary platen 40) provided between them, it is common to form a first molded component by the mold between the fixed platen 3 and the intermediate platen 4 (rotary platen 40), rotate the intermediate platen 4 (rotary platen 40) with the first molded component held in the mold half on the part of the intermediate platen 4 (rotary platen 40), and form a second molded component by the mold between the movable platen 5 and the intermediate platen 4 (rotary platen 40) so as to be molded on the first molded component. Hence, in order to take out the product by pushing a no-design surface of the first molded component held in the mold half on the part of the intermediate platen 4 (rotary platen 40), the two mold mounting surfaces of the intermediate platen (rotary platen 40) are provided respectively with product push-out means that can push out a resin molded product. Therefore, the thickness of the intermediate platen 4 (rotary platen 40) in the mold opening/closing direction becomes large.

However, depending on resin molded products, molding methods, etc., such a multilayer molding apparatus is also assumable that has no product push-out means on the intermediate platen (rotary platen) but lets the product be pushed out from the mold half on the part of the fixed platen or the movable platen. An example of the former case is a multilayer molding apparatus that opens the mold with the no-design surface of the first molded component held in the mold half on the part of the fixed platen, rotates the mold half on the part of the intermediate platen (rotary platen), and forming a second molded component to constitute the design surface on the first molded component so as to be molded thereon. In this case, a product push-out means is provided on the part of the fixed platen, i.e., on the fixed platen or on the mold half on the part of the fixed platen. An example of the latter case is a multilayer molding apparatus for a product having a design surface on its first molded component, that opens the mold with the design surface of the first molded component held in the mold half on the part of the intermediate platen (rotary platen), rotates that mold half in this state, and forming a second molded component to constitute a no-design surface on the no-design surface of the first molded component so as to be molded thereon. In this case, a product push-out means is provided on the part of the movable platen, i.e., on the movable platen or on the mold half on the part of the movable platen. The former and latter multilayer molding apparatuses may be embodied as a multilayer molding apparatus that is diverted from a normal injection molding apparatus with an intermediate platen (rotary platen), a second injection unit, etc., added. When pushing out a product from the mold half mounted on the movable platen in such an embodiment, it is preferable that the product push-out means that is inherently provided on the movable platen of the injection molding apparatus before diversion be diverted for the purpose. Here, a normal injection molding apparatus is an apparatus that performs injection molding by using a mold half mounted on the fixed platen 3 and a mold half mounted on the movable platen 5.

Here, the multilayer molding apparatus 1 according to the present embodiment is based on the latter multilayer molding apparatus or a multilayer molding apparatus diverted from a normal injection molding apparatus, and provided with a product push-out means 8 on the movable platen 5. Hence, the thickness of the intermediate platen 4 (rotary platen 40) in the mold opening/closing direction is small as compared with an intermediate platen of a multilayer molding apparatus (e.g., the multilayer molding apparatus of Patent Document 2), in or on which intermediate platen a product push-out means is provided. Furthermore, because the rotary platen 40 is provided therethrough with push-out pin through-holes 45 including push-out pin through-holes provided at positions coinciding with push-out pins 8a of the product means 8 provided on the movable platen 5, use of push-out pins 8a of which length is extended by what corresponds to the thicknesses of the dummy plate 6a, dummy plate 6b, and rotary platen 40 in the mold opening/closing direction allows the product push-out means 8 provided on the movable platen 5 to push out a resin molded product from the mold half mounted on the surface of the intermediate platen 4 or the rotary platen 40 facing the fixed platen 3.

That is, in the multilayer molding apparatus 1 according to the present embodiment, there is no need of newly providing a product push-out means for a normal molding purpose to the intermediate platen 4 (rotary platen 40) having no product push-out means. Hence, the thickness of the intermediate platen 4 (rotary platen 40) in the mold opening/closing direction does not become large, which makes it possible to reduce the limitations on the largest mold height of the molds that can be used. Like the fixing bolt holes corresponding to the fixing bolts 4d and the fixing bolts 43, push-out pin through-holes including push-out pin through-holes provided at positions coinciding with the push-out pins 8a of the product push-out means 8 are provided through the dummy plates 6a and 6b. The method for extending the length of the push-out pins 8a may be adding extensions to the existing push-out pins, or replacing the push-out pins with longer ones.

In order to perform normal molding by the multilayer molding apparatus 1 according to the present embodiment, it is preferable to remove a second injection unit that is used for multilayer molding. However, if the second injection unit is not an obstacle when mounting molds for normal molding or when performing normal molding, it is possible to retreat the second injection unit from its injecting position and leave it there, with appropriate curing of any parts that require curing.

With such a configuration, in the multilayer molding apparatus 1 according to Embodiment 1, the intermediate platen 4 and the rotary platen 40 are fixed on the movable platen through the dummy plates 6a and 6b. Since in the multilayer molding apparatus according to the present embodiment, the thickness of the intermediate platen 4 in the mold opening/closing direction is substantially the same as the thickness of the rotary platen 40 in the mold opening/closing direction, the surface of the intermediate platen 4 facing the fixed platen 3 can be used as a mold mounting surface, and a large-sized mold core 21 can be mounted directly on the mold mounting surface of the intermediate platen 4. Therefore, the limitations on the largest mounting dimension of the molds that can be used can be reduced. That is, since in the multilayer molding apparatus 1 according to Embodiment 1, the mold mounting surfaces of the rotary platen 40 are formed on the same planes as the surfaces of the intermediate platen 4 facing fixed platen 3 and the movable platen 5 and the mold mounting means 4a formed of screw holes, T slots, or the like are provided in the surfaces of the intermediate platen facing the fixed platen and the movable platen, it is possible to mount, directly on the intermediate platen 4 easily, a mold core 21 indicated by the two-dot chain line 4c that has a larger mounting dimension than that of a mold indicated by the two-dot chain line 42 mountable on the mold mounting surfaces of the rotary platen 40.

A mold cavity 19 to be paired with the mold core 21 is mounted on the front surface (=the surface facing the movable platen 5) of the fixed platen 3. Then, the movable platen 5 which is integrated with the intermediate platen 4 and the rotary platen 40 is moved by the mold clamping unit 14 in the mold, opening/closing direction such that the mold cavity 19 and the mold core 21 mounted between the fixed platen 3 and the intermediate platen 4 (rotary platen 40) are clamped. After this, the first injection unit 17 inserted into the through-hole 3a provided in the fixed platen 3 is connected with a resin gate 19a of the mold cavity 19 to perform normal injection molding in which a melt resin is injection-filled into a cavity formed by pairing the mold cavity 19 with the mold core 21.

The multilayer molding apparatus 1 according to Embodiment 1 is an apparatus that provides no product push-out means on the intermediate platen 4 rotary platen 40) but lets a product be pushed out from the part of the mold half mounted on the movable platen 5. Therefore, the thickness of the intermediate platen 4 (rotary platen 40) in the mold opening/closing direction is small, and a resin molded product can be pushed out from the mold core 21 mounted on the intermediate platen 4 (rotary platen 40) by the push-out pins 8a of the product push-out means 8 provided on the movable platen 5 through the dummy plates 6a and 6b and the rotary platen 40. Hence, the thickness of the intermediate platen 4 (rotary platen 40) in the mold opening/closing direction does not become large, and the limitations on the largest mold height of the molds that can be used can be reduced.

After a cooling and solidification time for the resin molded product has passed after injection filling, the mold is opened with the resin molded product held on the mold core 21 on the part of the intermediate platen 4 (rotary platen 40). After a product taking out means is inserted between the mold cavity 19 and the mold core 21 and let to grasp the resin molded product, the product push-out means 8 provided on the movable platen 5 is actuated to let the push-out pins 8a move through the dummy plates 6a and 6b and through the push-out pin through-holes 45 of the rotary platen 40 to push a push-out plate or the like of an in-mold push-out unit provided in the mold core 21 toward the part of the fixed mold 3. Thereby, the resin molded product is pushed out and carried to the outside of the mold by the product taking out means.

In Embodiment 1, the intermediate platen 4 and the rotary platen 40 are fixed on the movable platen 5. However, it is also possible to fix the intermediate platen 4 and the rotary platen 40 on the fixed platen 3, if a link-up hot runner is provided between the parallel mold mounting surfaces of the rotary platen 40, as in Embodiment 2 to be described later.

Figure 4:
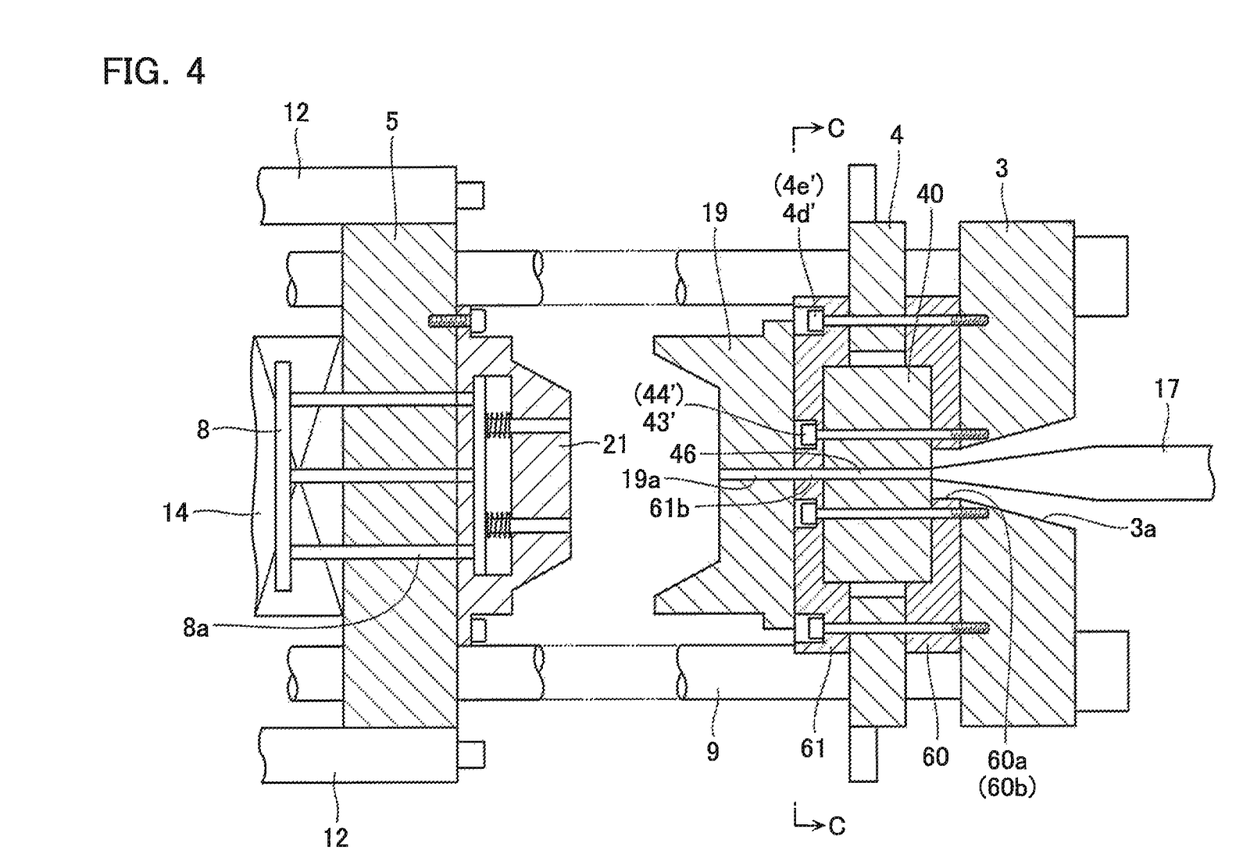
FIG. 4 is a schematic cross-sectional plan view of a multilayer molding apparatus according to Embodiment 2 of the present invention.
Figure 5:
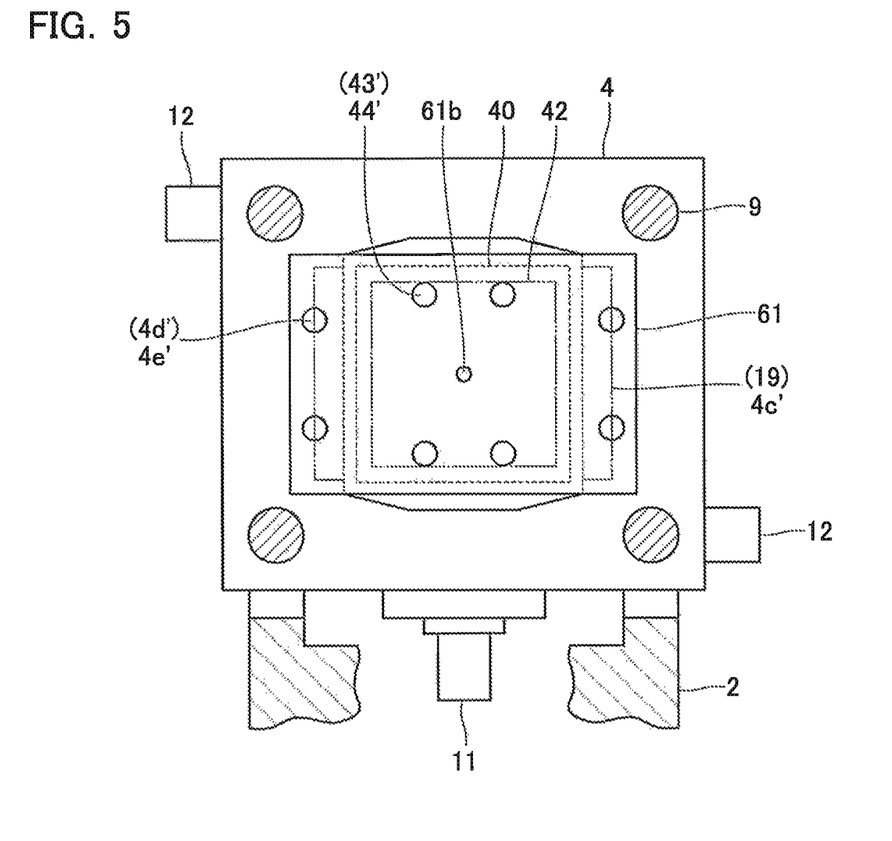
FIG. 5 is a schematic front elevation taken along a line C-C of FIG. 4 and seen in the direction of arrows.

Embodiment 2 of the present invention will now be explained with reference to FIG. 4 and FIG. 5. FIG. 4 is a schematic cross-sectional plan view of a multilayer molding apparatus according to Embodiment 2 of the present invention. FIG. 5 is a schematic front elevation taken along a line C-C of FIG. 4. Embodiment 2 is different from Embodiment 1 in that the intermediate platen 4 (rotary platen 40) is fixed not on the movable platen 5 but on the fixed platen 3 such that the mold mounted between the intermediate platen 4 (rotary platen 40) and the movable platen 5 is clamped, and in that the mold mounting surfaces of the rotary platen 40 are formed so as to protrude ahead of the surfaces of the intermediate platen 4 facing the fixed platen 3 and the movable platen 5, which makes portions that are concavo-convexed in the mold opening/closing direction, and mold mounting plates each having a mounting surface having an identical concavo-convex shape and a mold mounting surface parallel with the mounting surface and wider than the mold mounting surface of the rotary platen are attached to the concavo-convex shape portions. The basic configuration of the multilayer molding apparatus in the other respects and the injection molding method are basically the same as Example 1. Hence, only the differences from Embodiment 1 will be explained. Besides, since the multilayer molding apparatus of Embodiment 1 and that of Embodiment 2 have the same configuration except the differences explained above, the schematic cross-sectional plan view shown in FIG. 4 can be considered, in Embodiment 2, to correspond to the schematic cross-sectional plan view taken along the line B-B of FIG. 1 and seen in the direction of arrows.

As shown in FIG. 4, in the multilayer molding apparatus according to Embodiment 2, the intermediate platen 4 and the rotary platen 40 have different thicknesses in the mold opening/closing direction, and the mold mounting surfaces of the rotary platen 40 protrude, at the positions facing the fixed platen 3 and the movable platen 5, the surfaces of the intermediate platen 4 facing the fixed platen 3 and the movable platen 5 in the mold opening/closing direction to form concavo-convex shapes. Hence, the multilayer molding apparatus according to the present embodiment includes a first mold mounting plate 60 and a second mold mounting plate 61 for filling the thickness gaps between the intermediate platen 4 and the rotary platen 40 in the mold opening/closing direction. The first mold mounting plate 60 and the second mold mounting plate 61 each have a mounting surface having the same concavo-convex shape as the concavo-convex shape formed by the intermediate platen 4 and the rotary platen 40, and a mold mounting surface parallel with the mounting surface and wider than the mold mounting surface of the rotary platen 40. With the first mold mounting plate 60 provided between the fixed platen 3 and the intermediate platen 4 and rotary platen 40, the concavo-convex shape in the mold opening/closing direction is offset, which enables the intermediate platen 4 and the rotary platen 40 to be fixed on the fixed platen 3. An injection unit insertion through-hole 60a is formed in the first mold mounting plate 60, and the first injection unit 17 provided on the part of the rear surface of the fixed platen 3 is inserted into the injection unit insertion through-hole 60a to be connected to a link-up hot runner 46 provided between the parallel mold mounting surfaces of the rotary platen 40.

Instead of the injection unit insertion through-hole 60a, a link-up hot runner 60b may be formed between the mounting surface and mold mounting surface of the first mold mounting plate 60. The first injection unit 17 may be connected to the hot runner 60b. If the position of the intermediate platen 4 fixed on the fixed platen 3 through the first mold mounting plate 60 is not within the moving stroke of the intermediate platen moving units 12 provided on the movable platen 5, the leading end portions of the sliding actuators of the intermediate platen moving units 12 are previously decoupled from the intermediate platen 4 at their fixed positions. If the position of the fixed intermediate platen 4 is within the moving stroke of the intermediate platen moving units 12, the intermediate platen moving units 12 are used for moving the intermediate platen 4 to the position where it is to be fixed to the fixed platen 3, and there is no need of decoupling the leading end portions of the actuators from the intermediate platen 4 at their fixed positions, with only necessity for applying any necessary curing to the actuators of the intermediate platen moving unit 12, unless the actuators disturb mold replacement, molding, or product taking out.

Because the intermediate platen (rotary platen) is rotated while being mounted with molds of the same shape on both of its parallel mold mounting surfaces, it is common that the intermediate platen is configured to be symmetrical with respect to a plane that passes the rotation axis thereof and is parallel, with the fixed platen and the movable platen. Therefore, the intermediate platen 4 and rotary platen 40 fixed on the fixed platen 3 through the first mold mounting plate 60 have also their surface facing the movable platen 5 provided with the same concavo-convex shape as that provided on their surface facing the fixed platen 3. Hence, they can offset their concavo-convex shape in the mold opening/closing direction by the second mold mounting plate 61 to allow a mold cavity 19 to be mounted on the mold mounting surface of the second mold mounting plate 61. That is, the second mold mounting plate 61 has a portion that is located between the rotary platen 40 and the mold cavity 19, and a portion that is located between the intermediate platen 4 and the mold cavity 19, thereby offsetting the concavo-convex shape formed by the intermediate platen 4 and the rotary platen 40. The mold cavity 19 is mounted indirectly on the surface (mold mounting surface) of the intermediate platen 4 facing the movable platen 5 through the second mold mounting plate 61. Since the mold mounting surface of the second mold mounting plate 61 is wider than the mold mounting surface, of the rotary platen 40, it is possible to mount a mold cavity 19 indicated by a two-dot chain line 4c' that has a larger mounting dimension than a mold indicated by a two-dot chain line 42 that can be mounted on the mold mounting surface of the rotary platen 40 as shown in FIG. 5, allowing the limitations on the largest mounting dimension of the mold that can be used to be reduced.

A link-up hot runner 61b is provided between the mounting surface and mold mounting surface of the second mold mounting plate 61, and links up the resin gate 19a of the mold cavity 19 and the link-up hot runner 46 of the rotary platen 40, enabling a melt resin to be injection-filled into a cavity that is to be formed with the mold cavity 19 paired with a mold core 21 to be described later. Here, it is preferable that the hot runner configured by the hot runner 46 of the rotary platen 40 and the hot runner 61b of the second mold mounting plate 61 running from the first injection unit 17 to the resin gate 19a of the mold cavity 19 be provided with an adiabatic/heat-retention means or a heating means that can prevent a temperature drop of a melt resin during injection filling.

The first mold mounting plate 60, the intermediate platen 4, and the second mold mounting plate 61 are fixed on the fixed platen 3 by driving fixing bolts 4d' into fixing bolt holes 4e'. For more secure fixing, it is preferable that also the first mold mounting plate 60, the rotary platen 40, and the second mold mounting plate 61 be fixed on the fixed platen 3 by driving fixing bolt 43' into fixing bolt holes 44'. For easier illustration and explanation, these mold mounting plates and the intermediate platen 4 and rotary platen 40 are integrally fixed on the fixed platen 3 by means of bolt holes that are formed through all of them. However, with spot-faced holes or the like formed so as not for the bolt heads to protrude upon the respective surfaces, the plates and platens may be fixed individually one by one in a manner that the positions of the bolts, etc. on the respective planes do not overlap, such that the first molt mounting plate 60 is fixed on the fixed platen 3, then the intermediate platen 4 and rotary platen 40 are fixed on the first mold mounting plate 60, and finally the second mold mounting plate 61 is fixed on the intermediate platen 4 and rotary platen 40. In such a configuration, it is possible to use the mold mounting means 4a provided in the surfaces of the intermediate platen 4 facing the fixed platen 3 and the movable platen 5 and mold mounting means provided in the mold mounting surfaces of the rotary platen 40, in order to fix the first mold mounting plate 60 and the second mold mounting plate 61 to the intermediate platen 4. Furthermore, because the first mold mounting plate 60 and the second mold mounting plate 61 protect the mold mounting surfaces of the respective ones of the fixed platen 3 and the intermediate platen 4 and rotary plate 40, no such dummy plates as in Embodiment 1 are necessary.

With such a configuration, in the multilayer molding apparatus 1 according to Embodiment 2, the intermediate platen 4 and the rotary platen 40 are fixed on the fixed platen 3 through the first mold mounting plate 60. Since the mold mounting surface of the second mold mounting plate 61 mounted on the intermediate platen 4 and rotary platen 40 is wider than the mold mounting surface of the rotary platen 40, it is possible to mount a mold cavity 19 indicated by the two-dot chain line 4c' having a larger mounting dimension than a mold indicated by the two-dot chain line 42 mountable on the mold mounting surface of the rotary platen 40, making it possible to reduce the limitations on the largest mounting dimension of the mold that can be used.

A mold core 21 to be paired with the mold cavity 19 is mounted on the movable platen 5. The movable platen 5 is moved in the mold opening/closing direction by the mold clamping unit 14, and the mold cavity 19 and the mold core 21 mounted between the intermediate platen 4 (rotary platen and the movable platen 5 are clamped. After this, a single-layer injection molding method is implemented by connecting the first injection unit 17 inserted into the through-hole 3a provided in the fixed platen 3 and into the injection unit insertion through-hole 60a with the hot runner 46 of the rotary platen 40, and injection-filling a melt resin into a cavity formed by pairing the mold cavity 19 with the mold core 21 through the link-up hot runner 61b of the second mold mounting plate 61 that links up the link-up hot 46 to the resin gate 19a of the mold cavity 19.

After a cooling and solidification time for the resin molded product has passed after injection filling, the mold is opened with the resin molded product held on the mold core 21 on the part of the movable platen 5. After a product taking out means is inserted between the mold cavity 19 and the mold core 21 and let to grasp the resin molded product, the product push-out means 8 provided on the movable platen 5 is actuated to let the push-out pins 8a push a push-out plate or the like of an in-mold push-out unit provided in the mold core 21 toward the part of the fixed mold 3. Thereby, the resin molded product is pushed out and carried to the outside of the mold by the product taking out means.

The multilayer molding apparatus 1 according to Embodiment 2 is also an apparatus that provides no product push-out means on the intermediate platen 4 (rotary platen 40) but lets the product be pushed out from the part of the mold half mounted on the movable platen 5. Therefore, the thickness of the intermediate platen 4 (rotary platen 40) in the mold opening/closing direction becomes small, and a resin molded product can be pushed out from the mold core 21 mounted on the movable platen 5 by the push-out pins 8a of the product push-out means 8 provided on the movable platen 5. Hence, the thickness of the intermediate platen 4 (rotary platen 40) in the mold opening/closing direction does not become large, and the limitations on the largest mold height of the molds that can be used can be reduced, which is as described above. Moreover, the mold core 21 in which the resin molded product is held is mounted on the movable platen 5, which state is not at all different from the product taking out state of an original multilayer molding apparatus. Therefore, there is no need of extending the length of the push-out pins 8a of the product push-out means 8. On the other hand, when it is necessary to push out a product from the mold half mounted on the part of the fixed platen 3 depending on the shape of the product, it is possible to let a product push-out means provided on the fixed platen 3 push out the product through push-out pin through-holes provided in the rotary platen 40 or the like as explained in Embodiment 1, or alternatively, to let a product push-out means provided on the mold cavity 19 or on a mold half mounted on the part of the fixed platen 3 push out the product.

When performing normal molding by the multilayer molding apparatus 1 according to Embodiment 2, the hot runner is a bit long because injection filling is through the intermediate platen 4 (rotary platen 40), etc., which calls for a care for preventing a temperature drop of a melt resin, However, because no other components than the mold is mounted on the movable platen 5, the multilayer molding apparatus 1 according to Embodiment 2 is suitable not only for the normal injection molding method but also for injection molding methods that require a highly precise control on the mold opening/closing positions, such as an expansion molding method, an injection press molding method, an injection compression molding method, an in-mold coating method, etc.

There is also an embodiment in which the intermediate platen 4 and the rotary platen 40 are fixed on the movable platen 5 by using a first mold mounting plate 60 and a second mold mounting plate 61 for filling the thickness gaps between the intermediate platen 4 and the rotary platen 40 in the mold opening/closing direction like in Embodiment 2.

Further, in Embodiment 2, each of the first mold mounting plate 60 and the second mold mounting plate 61 for filling the thickness gaps between the intermediate platen 4 and the rotary platen 40 in the mold opening/closing direction forms one surface (a new mold mounting surface or the like) by itself, as shown in FIG. 4. That is, in Embodiment 2, the first mold mounting plate 60 offsets the concavo-convex shape formed by the intermediate platen 4 and the rotary platen 40 by having a portion that is located between the rotary platen 40 and the fixed platen 3 and a portion that is located between the intermediate platen 4 and the fixed platen 3. Also, in Embodiment 2, the second mold mounting plate 61 offsets the concavo-convex shape formed by the intermediate platen 4 and the rotary platen 40 by having a portion that is located between the rotary platen 40 and the mold cavity 19 and a portion that is located between the intermediate platen 4 and the mold cavity 19. However, the present invention is not limited to this, but the first mold mounting plate 60 and the second mold mounting plate 61 may offset only the mold opening/closing direction concaves of the intermediate platen 4 from the rotary platen 40 to form one surface (a new mold mounting surface or the like) together with the mold mounting surface of the rotary platen 4. That is, in Embodiment 2, the first mold mounting plate 60 may offset the concavo-convex shape formed by the intermediate platen 4 and the rotary platen 40 by being located only between the intermediate platen 4 and the fixed platen 3. Also, in Embodiment 2, the second mold mounting plate 61 may offset the concavo-convex shape formed by the intermediate platen 4 and the rotary platen 40 by being located only between the intermediate platen 4 and the mold cavity 19. This configuration of the first mold mounting plate 60 and second mold mounting plate 61 can be employed whichever of the fixed platen 3 and the movable platen 5 the intermediate platen 4 and rotary plate 40 are to be fixed on. This configuration can make the thickness, in the mold opening/closing direction, of the intermediate platen 4 and rotary platen 40 including the first mold mounting plate 60 and second mold mounting plate 61 smaller, making it possible to secure a day light which can be used for normal molding by a greater degree.

The present invention is not limited to the embodiments described above, but may be implemented in various embodiments. For example, in Embodiment 1 and Embodiment 2, the mold cavity is mounted on the part of the fixed platen whereas the mold core is mounted on the part of the movable platen, and a resin molded product is pushed out from the mold by a product push-out means provided on the part of the movable platen. However, the mold core may be mounted on the part of the fixed platen whereas the mold cavity is mounted on the part of the movable platen, and a resin molded product may be pushed out by a product push-out means provided on the part of the fixed platen.

In Embodiment 1 and Embodiment 2, a mold having a mounting dimension that is larger than the mold mounting surface of the rotary platen is mounted. However, normal molding is also available with a mold that is mountable on the rotary platen. Furthermore, in Embodiment 1 and Embodiment 2, bolts are used as a means for fixing the intermediate platen (rotary platen) to the movable platen or to the fixed platen. However, as long as a necessary fixing power is available, there are no specific limitations on the fixing means, and a preferable means may be selected from publicly-known fixing means. If this fixing means is configured to be capable of being actuated and released electrically, switching from the multilayer molding to single layer molding or from single layer molding to multilayer molding becomes easier.

Figure 6:
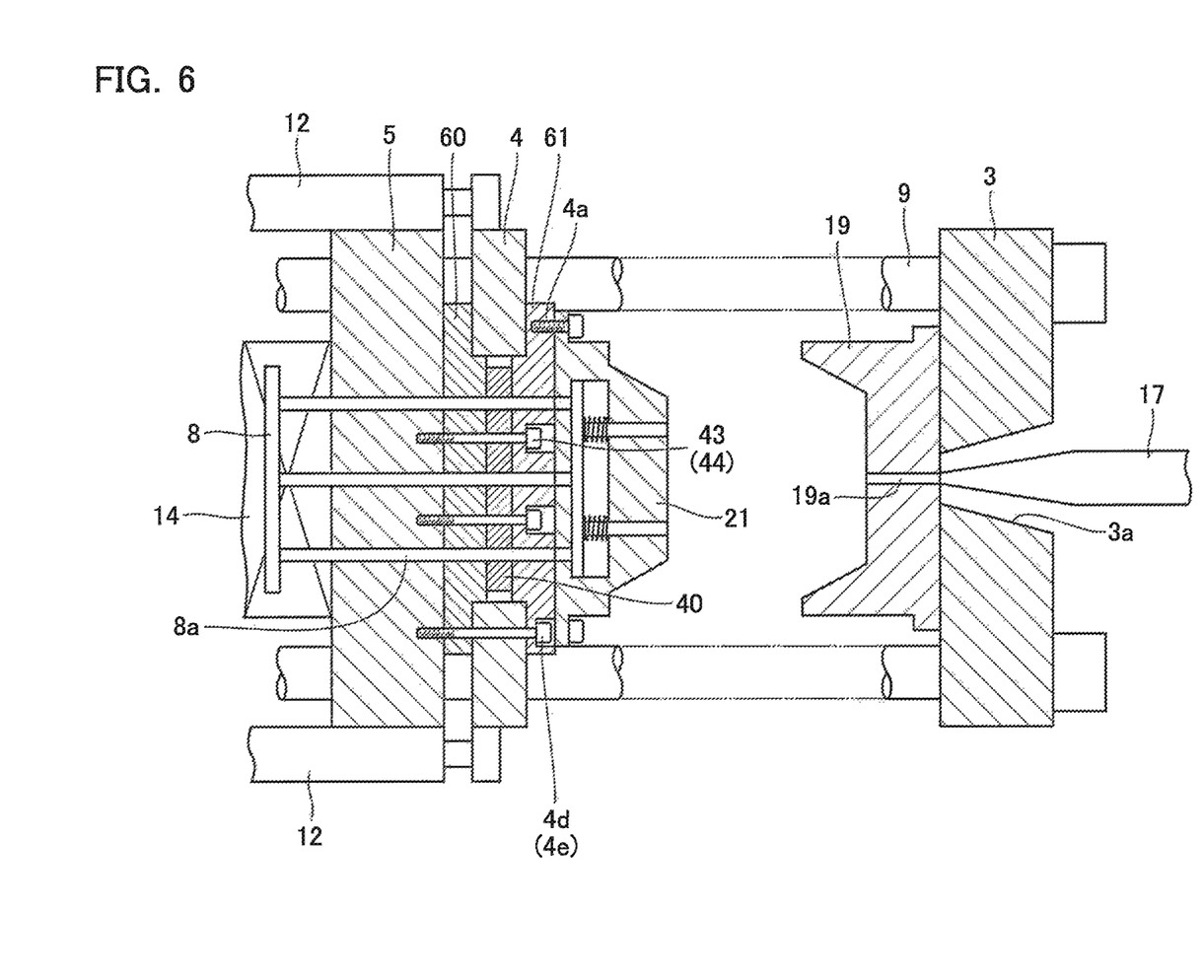
FIG. 6 is a schematic cross-sectional plan view of a multilayer molding apparatus according to Embodiment 3 of the present invention.

In Embodiment 2, the mold mounting surfaces of the rotary platen 40 protrude ahead of the surfaces of the intermediate platen 4 facing the fixed platen 3 and the movable platen 5 in the mold opening/closing direction at the positions facing the fixed platen 3 and the movable platen 5 to form concavo-convex shapes. However, for example, the mold mounting surfaces of the rotary platen 40 may be concaved in the mold opening/closing direction to form concave-convex shapes as shown in FIG. 6 (Embodiment 3). The multilayer molding apparatus according to Embodiment 3 is basically the same as Embodiment 1 and Embodiment 2 in the basic configuration of the multilayer molding apparatus and the injection molding method, and is the same as the multilayer molding apparatus of Embodiment 1 described above in that the intermediate platen 4 (rotary platen 40) is fixed on the part of the movable platen 5 and the same as the multilayer molding apparatus of Embodiment 2 described above in using mold mounting plates 60 and 61 for offsetting concavo-convex shapes formed by the intermediate platen 4 and the rotary platen 40. A detailed explanation about the multilayer molding apparatus according to Embodiment 3 will not be provided, because it is possible to get the picture of the multilayer molding apparatus according to Embodiment 3 easily by referring to the explanations about the multilayer molding apparatuses according to Embodiment 1 and Embodiment 2.

Also in the configuration of the multilayer molding apparatus according to Embodiment 3, the first mold mounting plate 60 and the second mold mounting plate 61 may offset only the concave shapes of the rotary platen 4 from the intermediate platen 4 in the mold opening/closing direction to form one surface (a new mold mounting surface or the like together with the mold mounting surface of the intermediate platen 4, as explained in Embodiment 2. That is, in Embodiment 3, it has been explained that the first mold mounting plate 60 offsets the concavo-convex shape formed by the intermediate platen 4 and the rotary platen 40 by having a portion that is located between the rotary platen 40 and the movable platen 5 and a portion that is located between the intermediate platen 4 and the movable platen 5. In Embodiment 3, it has also been explained that the second mold mounting plate 61 offsets the concavo-convex shape formed by the intermediate platen 4 and the rotary platen 40 by having a portion that is located between the rotary platen 40 and the mold core 21 and a portion that is located between the intermediate platen 4 and the mold core 21. However, the present invention is not limited to this. The first mold mounting plate 60 may offset the concavo-convex shape formed by the intermediate platen 4 and the rotary platen 40 by being located only between the rotary platen 40 and the movable platen 5. Also, the second mold mounting plate 61 may offset the concavo-convex shape formed by the intermediate platen 4 and the rotary platen 4 by being located only between the rotary platen 40 and the mold core 21. This configuration of the first mold mounting plate 60 and second mold mounting plate 61 can be employed whichever of the fixed platen 3 and the movable platen 5 the intermediate platen 4 and rotary platen 40 are to be fixed on.

Likewise, also when the mold mounting surfaces of the rotary platen 40 are formed on the same planes as the surfaces of the intermediate platen 4 facing the fixed platen 3 and the movable platen 5 at the positions facing the fixed platen 3 and the movable platen 5 as in Embodiment 1, use of the mold mounting plates as in Embodiment 2 allows the mold clamping force to be dispersed to the mold mounting surfaces of the rotary platen 40 and to the surfaces of the intermediate platen 4 facing the fixed platen 3 and the movable platen 5 even if the mold used has a size mountable on the mold mounting surfaces of the rotary platen 40, which makes it possible to reduce the load of the rotary platen 40 that is imposed on the rotary shaft 13 and the sliding portion of the rotary platen rotating unit 11. This effect can be achieved also when a mold having a size mountable on the mold mounting surfaces of the rotary platen 40 is used when the mold mounting surfaces of the rotary platen 40 are concaved in the mold opening/closing direction to form concavo-convex shapes as in Embodiment 3 explained above.

The multilayer molding apparatuses according to Embodiments described above can achieve the following effects.

Namely, the multilayer molding apparatus according to Embodiment 1 described above can have the intermediate platen 4 mounted with a mold larger than the mold mounting surfaces of the rotary platen 40, because the mold mounting surfaces of the rotary platen 40 are formed on the same planes as the surfaces of the intermediate platen 4 facing the fixed platen 3 and the movable platen 5 at the positions facing the fixed platen 3 and the movable platen 5 so as not to protrude ahead of the surfaces, facing the fixed platen 3 and the movable platen 5, of the intermediate platen 4 supporting the rotary platen 40.

The multilayer molding apparatuses according to Embodiments 2 and 3 described above can obtain mold mounting surfaces larger than the mold mounting surfaces of the rotary platen 40, because the concavo-convex shapes formed because the intermediate platen 4 and the rotary platen 40 have different thicknesses in the mold opening/closing direction can be offset by the mold mounting plates 60 and 61.

The multilayer molding apparatuses according to Embodiments 1 and 3 described above have push-out pin through-holes formed in the rotary platen 40 and in the mold mounting plates 60 and 61, and hence, when at least one of the intermediate platen 4 and the rotary platen 40 is fixed on the movable platen 5, can push out a resin molded product from the mold mounted on the intermediate platen 4 or on the rotary platen 40 by inserting the push-out pins 8a of the push-out means 8 provided on the movable platen 5 through the push-out pin through-holes formed in the rotary platen 40 and in the mold mounting plates 60 and 61.

The multilayer molding apparatuses according to Embodiments 1 to 3 are for pushing out a product from the part of the mold mounted on one of the fixed platen 3 and the movable platen 5, and have no product push-out means on the intermediate platen 4 (rotary platen 40). Therefore, the multilayer molding apparatuses according to Embodiments 1 to 3 described above can reduce the thickness of the intermediate platen 4 (rotary platen 40) in the mold opening/closing direction, and hence can secure a large day light between the other of the fixed platen 3 and the movable platen 5 and the intermediate platen 4 (rotary platen 40) fixed on the one of the fixed platen 3 and the movable platen 5, which allows for reducing the limitations on the largest mold height of the mold that can be used.

The multilayer molding apparatus according to Embodiment 2 has the link-up hot runner 46 formed in the rotary platen 40, the injection unit insertion through-hole 60a formed in the first mold mounting plate 60, and the link-up hot runner 61b formed in the second mold mounting plate 61. Hence, the multilayer molding apparatus according to Embodiment 2 can let the injection unit 17 injection-fill a melt resin into the mold through the link-up hot runner 46 of the rotary platen 40 and the link-up hot runner 61b of the second mold mounting plate 61, by letting the injection unit 17 be inserted into the injection unit insertion through-hole 60a of the first mold mounting plate 60 so as to be connected with the rotary platen 40.

A common multilayer molding apparatus including a fixed platen, a movable platen, and an intermediate platen (rotary platen) positioned between the fixed platen and the movable platen cannot help serving as an apparatus specializing in multilayer molding, as constrained by its configuration. If normal molding is attempted forcibly, such a multilayer molding apparatus will impose many limitations on the dimensions of the mold that can be used. Hence, these limitations are a severe bottleneck for manufacturers of resin molded products in introducing a multilayer molding apparatus, because the production volumes of normal molded products and multilayer molded products change daily. The multilayer molding apparatus according to the present invention and an injection molding method using the same allow for performing normal molding by a multilayer molding apparatus and for reducing the limitations on the dimensions of the mold that can be used. Hence, when performing normal molding by a multilayer molding apparatus, it is possible to use a mold for normal molding that has a larger size than a rotary mold used for multilayer molding, enabling the multilayer molding apparatus to be operated at a high efficiency in accordance with the production volumes of normal molded products and multilayer molded products. Hence, the present invention is very industrially applicable for manufacturers of resin molded products.

What is claimed is:

1. A multilayer molding apparatus, comprising:
a fixed platen;
a movable platen positioned so as to face the fixed platen and to be movable in a direction to come close to or be opened from the fixed platen;
an intermediate platen positioned between the fixed platen and the movable platen to be movable in the direction to come close or be opened, and having a surface facing the fixed platen, a surface facing the movable platen, and a housing space that goes therethrough from the surface facing the fixed platen to the surface facing the movable platen; and
a rotary platen rotatably supported by the intermediate platen inside the housing space of the intermediate platen, and having at least one pair of parallel surfaces facing the fixed platen and the movable platen,
wherein at least one of the surfaces of the intermediate platen facing the fixed platen and the movable platen is a mold mounting surface on which a mold can be mounted directly or indirectly,
wherein the intermediate platen and the rotary platen have different thicknesses in the direction to come close and be opened,
the multilayer molding apparatus further comprises a mold mounting plate for filling a thickness gap in the direction to come close and be opened between the intermediate platen and the rotary platen,
the mold mounting plate includes a portion located between the rotary platen and the mold and a portion located between the intermediate platen and the mold, and
the multilayer molding apparatus is capable of having the mold mounted on the mold mounting surface of the intermediate platen indirectly through the mold mounting plate.

2. A multilayer molding apparatus, comprising:
a fixed platen;
a movable platen positioned so as to face the fixed platen and to be movable in a direction to come close to or be opened from the fixed platen;
an intermediate platen positioned between the fixed platen and the movable platen to be movable in the direction to come close or be opened, and having a surface facing the fixed platen, a surface facing the movable platen, and a housing space that goes therethrough from the surface facing the fixed platen to the surface facing the movable platen; and
a rotary platen rotatably supported by the intermediate platen inside the housing space of the intermediate platen, and having at least one pair of parallel surfaces facing the fixed platen and the movable platen, wherein at least one of the surfaces of the intermediate platen facing the fixed platen and the movable platen is a mold mounting surface on which a mold can be mounted indirectly, wherein the intermediate platen and the rotary platen have substantially the same thickness in the direction to come close and be opened, and wherein the multilayer molding apparatus further comprises a mold mounting plate and is capable of having the mold mounted on the mold mounting surface of the intermediate platen via the mold mounting plate.

3. The multilayer molding apparatus according to claim 1, further comprising mold mounting means which mounts the mold on the mold mounting surface of the intermediate platen, wherein the mold mounting means is provided to the mold mounting surface of the intermediate platen.

4. The multilayer molding apparatus according to claim 1, further comprising product push-out means provided on the part of at least one of the fixed platen and the movable platen, wherein the product push-out means includes a push-out pin for pushing out a molded product formed between the fixed platen and the intermediate platen or a molded product formed between the movable platen and the intermediate platen, and the rotary platen has a push-out pin through-hole at a position coinciding with the push-out pin, for letting the push-out pin go through.

5. The multilayer molding apparatus according to claim 1, further comprising product push-out means provided on the part of at least one of the fixed platen and the movable platen, wherein the product push-out means includes a push-out pin for pushing out a molded product formed between the fixed platen and the intermediate platen or a molded product formed between the movable platen and the intermediate platen, and the mold mounting plate has a push-out pin through-hole at a position coinciding with the push-out pin, for letting the push-out pin go through.

6. The multilayer molding apparatus according to claim 5, wherein the rotary platen has a push-out pin through-hole at a position coinciding with the push-out pin, for letting the push-out pin go through.

7. The multilayer molding apparatus according to claim 1, wherein the rotary platen has a hot runner between one and the other of the at least one pair of parallel surfaces.

8. The multilayer molding apparatus according to claim 1, wherein the mold mounting plate has in the portion located between the rotary platen and the mold, an injection unit insertion through-hole into which an injection unit can be inserted or a hot runner through which a melt resin injected from the injection unit flows.

9. An injection molding method using the multilayer molding apparatus according to claim 1, comprising fixing at least one of the intermediate platen and the rotary platen on one of the fixed platen and the movable platen and clamping a mold mounted between the other of the fixed platen and the movable platen and the intermediate platen.

10. The injection molding method according to claim 9, using the multilayer molding apparatus according to claim 1 further comprising product push-out means provided on the part of at least one of the fixed platen and the movable platen, wherein the product push-out means includes a push-out pin for pushing out a molded product formed between the fixed platen and the intermediate platen or a molded product formed between the movable platen and the intermediate platen, and the rotary platen has a push-out pin through-hole at a position coinciding with the push-out pin for letting the push-out pin go through, the method comprising pushing out a molded product formed between the fixed platen and the intermediate platen or a molded product formed between the movable platen and the intermediate platen by letting the push-out pin of the product push-out means go through the push-out pin through-hole formed in the rotary platen.

11. An injection molding method using the multilayer molding apparatus according to claim 1, comprising fixing at least one of the intermediate platen and the rotary platen on one of the fixed platen and the movable platen directly or indirectly through the mold mounting plate, and clamping a mold mounted between the other of the fixed platen and the movable platen and the intermediate platen.

12. The injection molding method according to claim 11, using the multilayer molding apparatus according to claim 1 further comprising product push-out means provided on the part of at least one of the fixed platen and the movable platen, wherein the product push-out means includes a push-out pin for pushing out a molded product formed between the fixed platen and the intermediate platen or a molded product formed between the movable platen and the intermediate platen, and at least one of the mold mounting plate and the rotary platen have/has a push-out pin through-hole at a position coinciding with the push-out pin for letting the push-out pin go through, the method comprising pushing out a molded product formed between the fixed platen and the intermediate platen or a molded product formed between the movable platen and the intermediate platen by letting the push-out pin of the product push-out means go through the push-out pin through-hole formed in at least one of the mold mounting plate and the rotary platen.

* * * * *